United States Patent
Hartman

(10) Patent No.: US 12,518,600 B2
(45) Date of Patent: Jan. 6, 2026

(54) SYSTEM AND METHOD UTILIZED FOR AN APPLICATION RELATED TO A BET RELATED TO GOLF AND OTHER SPORTS

(71) Applicant: Bret Hartman, Clawson, MI (US)

(72) Inventor: Bret Hartman, Clawson, MI (US)

(73) Assignee: Bret Hartman, Clawson, MI (US)

( * ) Notice: Subject to any disclaimer, the term of this patent is extended or adjusted under 35 U.S.C. 154(b) by 195 days.

(21) Appl. No.: 18/372,357

(22) Filed: Sep. 25, 2023

(65) Prior Publication Data

US 2024/0105023 A1    Mar. 28, 2024

Related U.S. Application Data

(60) Provisional application No. 63/409,299, filed on Sep. 23, 2022.

(51) Int. Cl.
*G07F 17/32* (2006.01)
*G06V 20/40* (2022.01)
*H04L 9/32* (2006.01)
*H04N 5/913* (2006.01)

(52) U.S. Cl.
CPC .......... *G07F 17/3288* (2013.01); *G06V 20/42* (2022.01); *G06V 20/48* (2022.01); *G07F 17/3241* (2013.01); *H04L 9/321* (2013.01); *H04N 5/913* (2013.01); *H04N 2005/91342* (2013.01)

(58) Field of Classification Search
None
See application file for complete search history.

(56) References Cited

U.S. PATENT DOCUMENTS

| | | | | |
|---|---|---|---|---|
| 10,926,183 | B2* | 2/2021 | Covington | G06N 7/01 |
| 11,107,328 | B2* | 8/2021 | Nelson | G07F 17/3288 |
| 11,311,808 | B2* | 4/2022 | Schwartz | G06Q 50/34 |
| 11,875,423 | B2* | 1/2024 | Hogwood | G06F 17/11 |
| 2021/0027576 | A1* | 1/2021 | Nelson | H04N 19/44 |
| 2023/0009825 | A1* | 1/2023 | Rosette | G07F 17/3288 |

* cited by examiner

*Primary Examiner* — Ronald Laneau
(74) *Attorney, Agent, or Firm* — Dickinson Wright PLLC

(57) ABSTRACT

A method discloses activating an application on one or more devices to record one or more video images associated with the video event, wherein the application is configured to be secured and create the one or more video images as uneditable, obtaining one or more video images that include at least a time stamp, sending the one or more video images to a remote server upon completing of the video images, identifying, utilizing video recognition at the remote server, whether the one or more videos includes an action associated with a goal of a sporting event tied, wherein the sporting event is tied to a fund that includes wagers from one or more participants of the sporting event, determining if the one or more video images has been modified by evaluating at least the time stamp, and outputting, in response to the evaluation, a notification indicating a winning entry associated with the video.

20 Claims, 8 Drawing Sheets

| User ID | Live Event ID | Wager | Amount | Video Authenticated |
|---|---|---|---|---|
| Bhartman | 98765 | Hole-in-one | $ 5 | Yes |
| M Jotenate | 12345 | Birdie | $ 10 | No |
| C Smith | 54321 | Eagle | $ .50 | Yes |

| Live Event User | File | ID | W/L |
|---|---|---|---|
| bhartman | 23.MPH | 12345 | W |

FIG. 3

| Live Event ID | Play ID | Wager | File |
|---|---|---|---|
| 08192022 | 53 | $ 10 | Baseball. MP4 |

FIG. 4

| User ID | Wager Information | Video | Event ID | GPS Information |
|---|---|---|---|---|
| Bhartman | $ 10 | 1. MP4 | 081121111 | XYZ |

SYSTEM AND METHOD UTILIZED FOR AN APPLICATION RELATED TO A BET RELATED TO GOLF AND OTHER SPORTS

CROSS-REFERENCE TO RELATED APPLICATIONS

This application claims the benefit and priority of U.S. Serial Application No. 63/409,299 filed Sep. 23, 2022, the entire disclosure of which is incorporated by reference herein.

TECHNICAL FIELD

The present disclosure relates to an application as related to using real-time sports information from individual players to play in a game.

BACKGROUND

The prevalence of social media has made the capturing of significant or exciting events important to many people. The spread of sports wagering that has accompanied the Supreme Court's ruling on the Professional and Amateur Sports Protection Act allows gambling for amateurs. To capture these experiences users currently need to capture the experience in real time, taking time and focus away from both their wagering experience and their experience of the sports event activities that they are engaged in to wager on. The user may want to capture information from them playing the sport, the wagering platform and their own experience, in order to memorialize the experience and capitalize on the fun. However, to ensure accuracy and mitigate tampering, methods need to be conducted to ensure fair play.

Current sports betting platforms provide numerous different ways to wager on entire sporting events, or individual aspects or portions of those events. Betting on portions of events, or micro-betting, has become more accessible. However, it's difficult for individuals to gamble in a huge network themselves or participate in events. One problem is that it may be difficult to communicate with others which portion of an event a person successfully wagered on and to ensure accuracy and honesty of the bet.

SUMMARY

According to a first embodiment, a method discloses activating an application on one or more devices to record one or more video images associated with the video event, wherein the application is configured to be secured and create the one or more video images as uneditable, obtaining one or more video images that include at least a time stamp, sending the one or more video images to a remote server upon completing of the video images, identifying, utilizing video recognition at the remote server, whether the one or more videos includes an action associated with a goal of a sporting event tied, wherein the sporting event is tied to a fund that includes wagers from one or more participants of the sporting event, determining if the one or more video images has been modified by evaluating at least the time stamp and the one or more videos accomplished the goal tied to the sporting event, outputting, in response to determining the video images has been modified, a cancelation notification indicating cancellation of participation in the sporting event, and outputting, in response to the evaluation, a notification indicating a winning entry associated with the video, wherein the winning entry is associated to a reward associated with the funds.

According to a second embodiment, a system disclose a processor programmed to activate an application to record one or more video images associated with the video event, wherein the application is configured to be secured to mitigate modification of the one or more video images, obtain one or more video images that include at least a time stamp, send the one or more video images to a remote server upon completing of the video images, identify, utilizing video recognition at the remote server, whether the one or more videos includes an action associated with a goal of a sporting event, wherein the sporting event is tied to a fund that includes wagers from one or more participants of the sporting event, determine if the one or more video images has been modified by evaluating at least the time stamp, evaluate the action of the one ore more videos of accomplishing the goal tied to the sporting event, and output, in response to the evaluation, a notification indicating a winning entry associated with the one or more video images, wherein the winning entry is associated to a reward associated with the fund.

According to a third embodiment, a method of recording a video event includes activating an application on one or more devices to record one or more video images associated with the video event, wherein the application is configured to be secured and create the one or more video images as uneditable, obtaining one or more video images that include at least a time stamp, sending the one or more video images to a remote server upon completing of the video images, identifying, utilizing video recognition at the remote server, whether the one or more videos includes an action associated with a goal of a sporting event tied, wherein the sporting event is tied to a fund that includes wagers from one or more participants of the sporting event, determining if the one or more video images has been modified by evaluating at least the time stamp and the one or more videos accomplished the goal tied to the sporting event, and output, in response to the evaluation, a notification indicating a winning entry associated with the video, wherein the winning entry is associated to a reward associated with the funds.

BRIEF DESCRIPTION OF THE DRAWINGS

FIG. 3 illustrates an event wager database, according to an embodiment.

FIG. 4 illustrates a recording database, according to an embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

For example, a game that a user may participate in may be a hole-in-one competition. Each year there are approximately 450 million rounds of golf played in the U.S., which is approximately 25,000-30,000 per course. Each course reports between 10-15 aces per year. Basically, that means a hole-in-one is scored every 3,500 rounds. Only 1-2% of golfers score an ace in a year. The average years of playing golf for a player before making an ace is 24. The age group that makes up golfers that score a hole-in-one are golfers between 50-59, which account for 25% of aces each year. The next highest percentage age group consists of players between 40-49, who account for 24% of annual aces. 16% of holes-in-one are made by women and the average age of those women is 55. The average handicap of a golfer who makes a hole-in-one is 14.

Figures 1, 2:
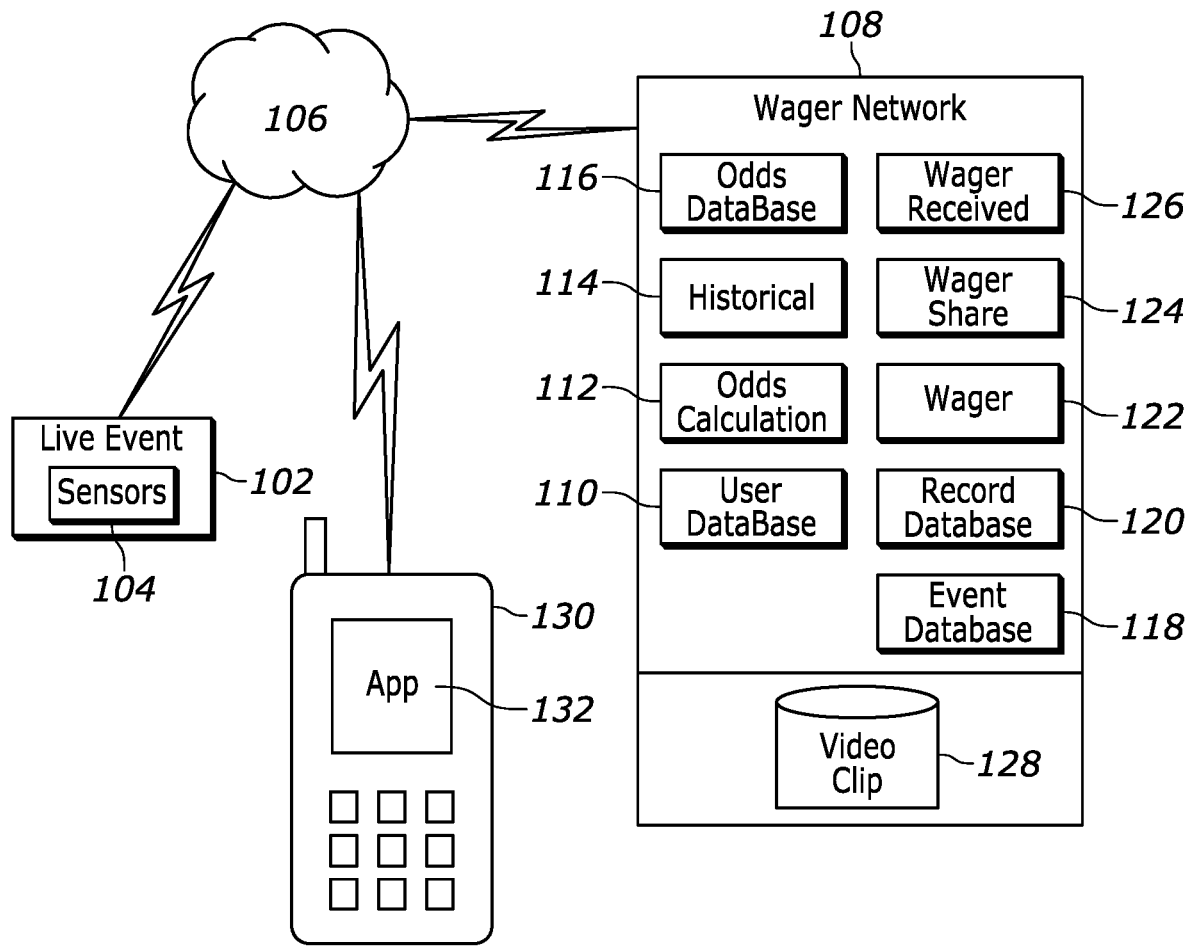
FIG. 1 includes an illustrative embodiment of a player focused betting system, according to an embodiment.
FIG. 2 illustrates a user database, according to an embodiment.

FIG. 1 is a system for a wager replaying and sharing system. This system may include a live event 102, for example a sporting event such as a golfing, football game, basketball game, baseball game, hockey game, tennis match, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice or hold that the sportsbook takes. Another type of wager the bettor can make is an over/under, in which the user bets over or under a total for the live event, such as the score of American football or the run line in baseball, or a series of action in the live event. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racing will take an available wager off the board. As the line moves there becomes an opportunity for a bettor to bet on both sides at different point spreads in order to middle and win both bets. Sportsbooks will often offer bets on portions of games, such as first half bets and half time bets. Additionally, the sportsbook can offer futures bets on live events 102 in the future. Sportsbooks need to offer payment processing services in order to cash out customers. This can be done at kiosks at the live event or at another location.

Further, embodiments may include a plurality of sensors 104 that may be used such as motion sensors, temperature sensors, humidity sensors, cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

Further, embodiments may include a cloud 106 or communication network that may be a wired and/or a wireless network. The communication network, if wireless, may be implemented using communication techniques such as Long Term Evolution (LTE), Wi-Fi, Visible Light Communication (VLC), Worldwide Interoperability for Microwave Access (WiMAX), Wireless Local Area Network (WLAN), Infrared (IR) communication, Public Switched Telephone Network (PSTN), Radio waves, and other communication techniques known in the art. The communication network may allow access to shared pools of configurable system resources and higher-level services that can be provisioned with minimal management effort, often over the Internet and relies on sharing of resources to achieve coherence and economies of scale, like a public utility, while third-party clouds allow organizations to focus on their core businesses instead of expending resources on computer infrastructure and maintenance. The cloud 106 may be communicatively coupled to wagering network 108 or any other network. The wagering network 108 may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud may not receive data gathered from sensors 104 and may instead, receive data from an alternative data feed. This data may be compiled substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network 108 may evaluate a video that is uploaded and the wager associated with the bet. The wagering network 108 (or cloud 106) may also be synchronized with game situational data, such as the time of the game, type of game, the score, location on the field, weather conditions, and the like which may affect the choice of play utilized. For example, in other exemplary embodiments, wagering network 108 may not receive data gathered from sensors 104 and may, instead, receive data from an alternative data feed, such as Sports Radar®. This data may be provided substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may include a user database 110 which contains data relevant to all users of the system, which may include, a user ID of the user, a device identifier for their mobile device 130, GPS location, type of device, camera information, and could also include wagering history on the user, contacts which are used by the wager sharing server to send wager invitations to, and other relevant user data. Other user data may be utilized that allows the user's golf handicap to be identified, GHIN data, home club or course, etc.

Further, embodiments may include an odds calculation server 112 which utilizes data, such as the historical play data, to calculate odds for in-play wagers. The odds calculation server may be utilized to identify a jackpot or pay-out for certain events.

Further, embodiments may include a historical plays database 114, that contains play data for the type of sport being played in live event 102. For example, in golf for optimal odds calculation, the historical play data should include meta data about the historical plays, such as time, location, weather, hole information (e.g., how many holes-in-one, albatross/double eagles, eagles, birdies, pars, bogeys, etc.), physiological data, etc. Thus, the system may give a bonus jackpot for a getting a hole-in-one on a day with bad weather or a more difficult hole.

Further, embodiments may include an odds database 116 that contains the odds calculated by the odds calculation server to display the odds the user's mobile device 130 and to take bets from the user through the mobile device wagering app 132. The odds database 116 may be updated in real-time to reflect environment changes. For example, the odds of hitting a hole in one is 12,500 to 1 for a person, but 2,500 to 1 for a professional golfer. The wagering app 132 may also include the ability to record the live events in a secure environment and without modification, as described further below.

In one embodiment, the system may include an event wager database 118 which stores users wagers during a live event 102 including wagers placed on specific plays and including the results of the wager. One game may include a hole-in-one associated with the entire country. The system may record every wager for this game in the event wager database until a hole-in-one is scored.

Further, embodiments may include a recording database 120 which stores recordings of a live event 102 as individual plays occurring during the live event 102.

Further, embodiments may include a base wagering server 122 that allows the user to log into the wagering network 108, view the selectable wagers, and make a wager, the base wagering server 122 creates timestamps for the beginning and end of a play which are stored in the event wager database 118, if the user wins the wager the base wagering server 122 initiates the wager sharing server 124, then initiates the wager receiving server 126.

Further, embodiments may include a wager sharing server 124 which allows users to share successful wagers with their contacts in the user database 110.

Further, embodiments may include a wager receiving server 126 which allows users to receive successful wagers that have been shared with them by other users.

Further, embodiments may include a clip database 128 which stores the recordings of individual plays with the wagering information overlaid, in some embodiments this database may be on the user's mobile device 130. The clip database 128 may only store clips that are verified to be authentic and untampered.

Further, embodiments may include a mobile device 130 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices allows for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 130 could be an optional component and would be utilized in a situation in which a paired wearable device is utilizing the mobile device 130 as additional memory or computing power or connection to the internet.

Further, embodiments may include a wagering app 132, which may allow a user to place bets on individual plays in the live event 102, and display the audio and video from the live event 102, along with the available wagers on the mobile device 130. The wagering app 132 allows the user to interact with the wagering network 108 in order to place bets and provide payment/receive funds based on wager outcomes.

FIG. 2 illustrates the user database 110. The user database 110 contains data relevant to all users of the system and contains at least a user ID for each user and the user IDs of that user's contacts, for example user Bret Hartman has the user ID bhartman, in his contacts he has jhartman, the user ID for his friend James Hartman, khartman, the user ID for his wife Kathren Hartman, birdie_golfer_1982, the user ID for his friend Chris Smith, etc., in some embodiments the user database 110 may contain a user ID of the user, a device identifier for their mobile device 128, a list of the players indicated as favorites by the user through the user database 110, and could also include wagering history on the user. The user database may include a wager, a live event id associated with the event the user is participating in, a wager amount (e.g., dollar amount), time stamp information or other vide clip information, whether the video was authenticated, etc.

FIG. 3 illustrates the event wager database 118. The event wager database 118 contains users wagers during a live event 102 including time stamps for wagers placed on specific plays and including the results of the wager. The database contains a user ID, for example, "bhartman", the selected wager option, for example, run, whether the wager was won or lost, a live event ID, for example, "golf_08192022_23.MP4", a play ID, for example, "12", in some embodiments the database may contain additional data such as wager amount, wager odds, etc. The wager database may include the jackpot amount of each game or event that a participant may take place in.

The wagering database may list events and bet amounts. Events may be based on a location, golf course, country, etc. For example, an event may be limited to a specific country club, course, location, group of friends, state, country, city, county, etc. For example, a game entry may be limited to an ACE or to pay for a hole in one for golf. Various games may exist for various sports, board games, etc.

In one example, the system may have an "ACES" event that requires a participant to pay a fee to enter the event. The ACES event may reward a prize to the first participant to score a hole in one, for example. The prize may be tied to the number of participants that set forth the wager. Thus, only participants that put forth a wager have an opportunity to play. Further, participants must record the video of the shot using the application to ensure no modification. Even further, the ball flight must be tracked during the entire process. For example, the application may include image recognition software that is configured to track the golf ball. The tracking may identify where the ball is to ensure no modification of the event. For example, someone throwing a ball in from behind a tree near or at the hole. Thus, the ball flight must be tracked from teeing off to landing.

Any type of game may exist in golf. For example, besides a hole-in-one game where the winner is required to capture a video of a hole-in one, there can be a game related to a certain putting distance (e.g., 25 foot putt), lowest 18 hole or 9 hole score, or any other type of game. The game may allow for a set wager per buy-in or any increase in wager.

In basketball, a game may exists with how many half court shots are recorded in a row or how many three pointers a person makes in a row. The contest may run a time duration (for example every month, week, year, or any duration). Once that time duration is up a winner will be deemed. In the case of a tie the money will be split evenly amongst the winners who made the most three-pointers in a row. The contest may tied to a charity event or a competitive contest with an entry fee tied to a charity. Thus, it may be also a charity contest that is under a charity license. Thus, all or a portion of the proceeds that are tied to an entry fee may be provided to a charity.

In football, examples of events may be a recording of how many field goals in a row from a set yardage at buy-in price per attempt. For example, a $50 buy-in may be utilized to see how many 30 yard field goals you can make in a row. Any game or competition of some difficulty that can be measured and authentically recorded based on a secured and untampered app video so everything is legal or legit. Location information may be utilized to verify authenticity of distances and standards. The public has the ability to become a game host and create any type of competition from any sport, contest or activity.

FIG. 4 illustrates the recording database 120. The recording database 120 contains recordings of a live event 102 either in its entirety from the application or as individual plays occurring during the live event 102. The database contains a live event ID, for example, a baseball game recorded on Aug. 19, 2022 could have a live event ID such as "baseball_08192022", a play ID, for example, the 53rd play of the game, or at least the 53rd play on which a wager may be placed, would have a play ID of "53", and a recording file, for example, the recording file for the 53rd play of the baseball game on Aug. 19, 2022 may be titled "baseball_08192022_23.MP4".

Figure 5:
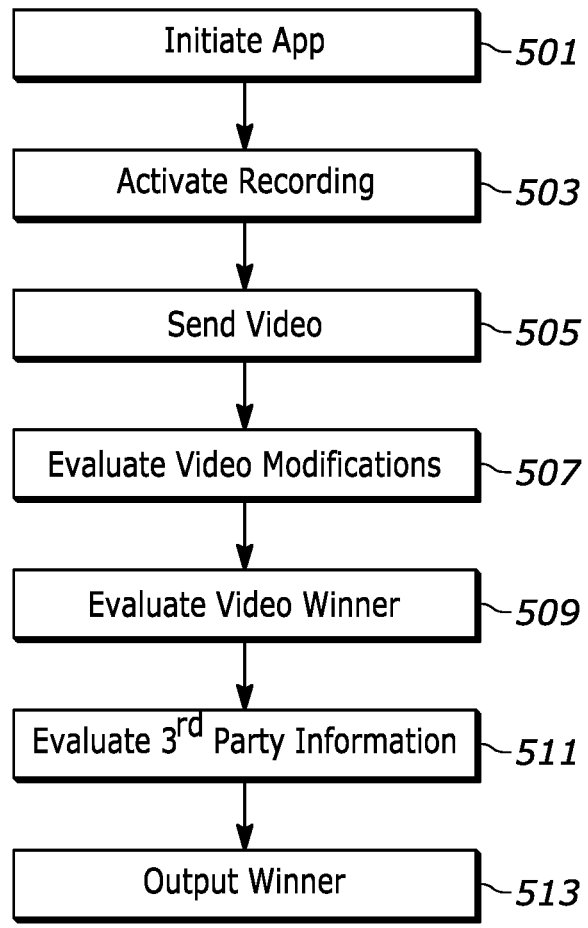
FIG. 5 illustrates a flowchart of recording a video and verifying authenticity.

FIG. 5 illustrates an example of recording a video event. In one embodiment, the embodiments may require that the video be recorded utilizing a specific application that prevents any editing. For example, a user may be required to utilize a phone, tablet, laptop, other computer device that has a dedicated application for the viewing. Thus, at step 501, the system may initiate launching of the application in response to a user activating it.

At step 503, the user may activate a recording of the event. During the recording of the event, the application may utilize surrounding data to ensure accuracy and eliminate any editing of the recording. For example, the system may ensure that the original copy only of the video is utilized. Thus, the recording may be immediately uploaded to a remote server and not allow for editing. As such, the recording may include location data (e.g. GPS information) or other information.

At step 505, the video may be sent to a server. The video may be uploaded or transmitted to a server via an internet, including 4G, 5G, Wi-Fi, or any type of wired or wireless connection. The video may be only stores at a remote server, rather than an electronic device, in various embodiments. The video may also be immediately encrypted to ensure no editing from any users to alter the shot.

At step 507, the system may evaluate the video for any modifications or foul play. For example, utilizing image tracking software, it may be monitor for any irregular patterns of a golf strike, for example. Upon detecting any modifications or foul play, a user may be penalized or banned from the game entry or the platform. The system may first analyze the video data to ensure that the proper data is utilized. For example, any type of encryption or decryption may be done on the video. For example, each application may automatically encrypt a video in a certain manner, however, the decryption can only be accomplished at the remote server. Thus, the key may be stored at the remote server and decrypt the key. The key may be removed from any of the participants to award any allowance of editing of the video. Thus, the video may be immediately encrypted to prevent any editing or tampering.

At step 509, the system may evaluate the video for a winning entry. The evaluation may include manual evaluation from a person, as well as image tracking or image recognition. For example, software located at the server may be utilized to evaluate object tracking. The object tracking may analyze the key object in the sport or game (e.g., golf ball, basketball, football, etc.) to identify where the key object is moving. The object tracking may analyze whether or not the object tracking gets to the proper location, such as a hole, basket, field goal post, etc.

At step 511, the system may continue to evaluate the entry video utilizing third party information. Such third party information may include uploaded contracts, affidavits, secondary videos, etc. For example, a second video may be evaluated utilizing image recognition and tracking software. In another example, a course may include a separate camera located at or near a hole to evaluate the shot (e.g., a hole-in-one). Drones or any other type of camera may be utilized as a separate source for evaluation from the participant's device.

At step 513, the system may output the winner once it is determined. Once the winner or winners are determined, the system may calculate the prize currency associated with each winner. From there, the system may send notifications to the winner and/or all participants to notify who the winner is. The output may include a stream associated with the winning clip or may include the associated prize.

Figure 6:
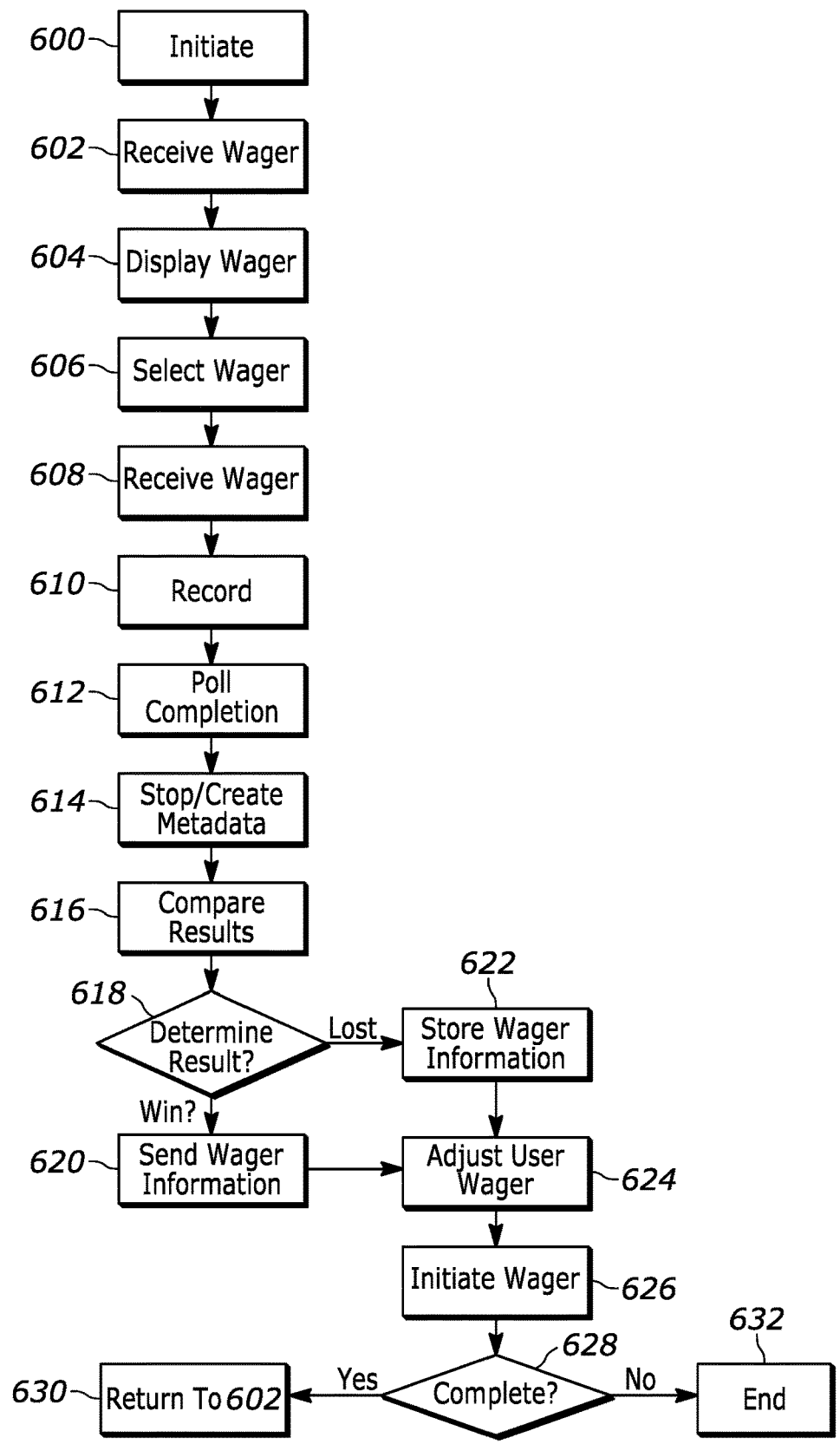
FIG. 6 illustrates a base wagering server, according to an embodiment.

FIG. 6 illustrates the base wagering server 122. The process begins with the base wagering server 122 being, at step 600, initiated by user login via the wagering app 128, for example user Bret is playing golf and logs into the wagering app 128 to make wagers. The login includes at least a user ID, in some embodiments the login may include security credentials such as a password. The base wagering server 122 retrieves, at step 602, the available wagers for the current play of the live event 102 from the odds calculation server 112, in an embodiment wagers and odds may be retrieved from a third party. The base wagering server 122 displays, at step 604, the available wagers for the current play and the associated odds for each wager. The base wagering server 122 prompts, at step 606, the user to select one of the available wagers, for example, user Bob can wager that the next play will be a strike or home run, in an embodiment this selection process may be facilitated by a GUI within the wagering app 130. The base wagering server 122 receives, at step 608, the user's selection of wager for the current play and the amount of money the user has wagered. The base wagering server 122 begins, at step 610, to record the play of the live game 102. The base wagering server 122 polls, at step 612, for completion of the current play of the live event 102. The base wagering server 122 stops, at step 614, recording the play and stores the created record in the recording database 120. The stopping may create extra metadata for the video, including encryption keys/decryption keys, time stamps, etc. The base wagering server 122 compares, at step 616, the actual results of the play of the live event 102 to the user's wager selection. The base wagering server 122 determines, at step 618, if the user won the wager based on the comparison of the results to the selected wager, if the user did not win the wager, the base wagering server 122 skips to step 622. If the user won the wager, the base wagering server 122 initiates, at step 620, the wager sharing server 124 and sends the wager information. The base wagering server 122 stores, at step 622, the user ID, wager selection, wager results, live game ID, and play ID, in the event wager database 118. The base wagering server 122 adjusts, at step 624, the user's balance in the user database 110 based on whether the wager was won or lost. In one embodiment, a third party will instead handle user balance and payments. The base wagering server 122 initiates, at step 626, the wager receiving server 126. The base wagering server 122 determines, at step 628, if the live event 102 is complete via data from the camera and/or sensor feeds 104, in some embodiments the end of the live event may be manually determined or determined by a remote server. If the live event 102 is not complete, the base wagering server 122 returns, at step 630, to step 602. If the live event 102 is complete, the base wagering server 122 ends, at step 632.

In further embodiments, it may be understood that the making or generating of a recording may not be performed and, instead, a video file which has already been created and may be stored in a database or otherwise linked, may be utilized in any of the embodiments. For example, a video file stored in another database may have utilize timestamps associated with a beginning and end of a play. Further, any polling or determining of a start and end portion of a play may be done without a new recording being generated, locally or otherwise.

Figure 7:
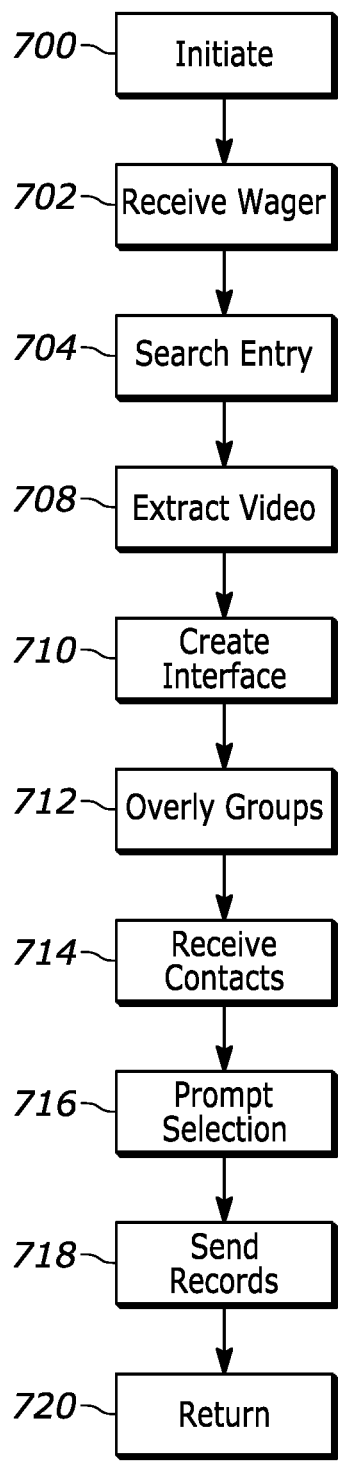
FIG. 7 illustrates a wager sharing server, according to an embodiment.

FIG. 7 illustrates the wager sharing server 124. The process begins with the wager sharing server 124 being, at step 700, initiated by the base wagering server 122. The wager sharing server 124 receives, at step 702, wager information from the base wagering server 122. The wager sharing server 124 searches, at step 704, for the associated entry or recording in the recording database 120. The wager sharing server 124 may extract, at step 708, the recording file from the matching entry. The wager sharing server 124 creates, at step 710, an interface output using the received wager information, the data is inserted into a graphical user interface which creates a graphic for the wager, in some embodiments more than one graphical template may exist and the wager sharing server 124 may select one. The wager sharing server 124 may overlay, at step 712, the created graphic onto the recording such that the viewer will see both the video and the graphic with the video behind the graphic. The wager sharing server 124 retrieves, at step 714, contacts for the user from the user database 110. The wager sharing server 124 prompts, at step 716, the user to select which contacts they want to share the wager and play with, for example user Bret can select from any of his contacts in the user database 110 like his friend Mark who has the user Id "mjotanovic", in some embodiments this selection may be facilitated by a GUI. The wager sharing server 124 sends, at step 718, the recording with the created graphical overlay to the selected contacts. The wager sharing server 124 returns, at step 720, to the base wagering server 722. In other embodiments, the wagering information may be shared just via the graphical and not a video of the recorded shot or event.

Figures 8, 9:
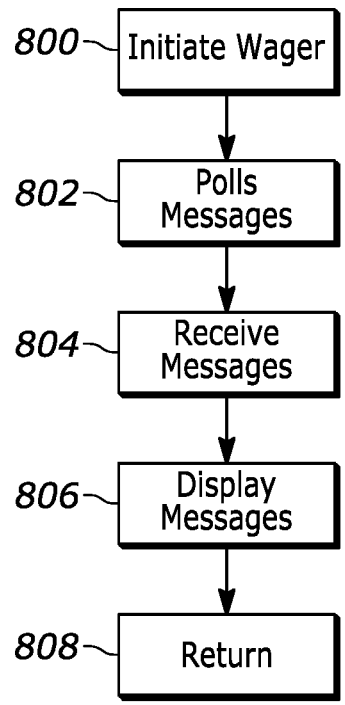
FIG. 8 illustrates a wager receiving server, according to an embodiment.
FIG. 9 illustrates a clip database, according to an embodiment.

FIG. 8 illustrates the wager receiving server 126. The process begins with the wager receiving server 126 being, at step 800, initiated by the base wagering server 122. The wager receiving sever 126 polls, at step 802, for messages from the wagering network 108, for example, video files sent by the wager sharing server 124. The wager receiving server 126 receives, at step 804, the message or messages from the wagering network 108, for example user Bret Hartman receives a message from his friend Joe Smith delivered via the wagering network 108. The wager receiving server 126 displays, at step 806, the received messages or game entry to the user via the user's wagering app 130, for example user Bret Hartman looks at his message from his friend Joe Smith, the message is a video file of a golf shot form Bret Hartman, Bob sees the recording of the shot by Bret with information about Joe's wager overlayed. The wager receiving server 126 returns, at step 808, to the base wagering server 122.

FIG. 9 illustrates the clip database 128. The clip database 128 stores the recordings of shots that are uploaded and may include the wagering information overlayed and includes a user ID. In one example, it may include for example "bhartman", a video file or clip, for example, "1.MP4", the selected wager option, for example, hole-in-one, whether the wager was won or lost, a live event ID, for example, "081121111", a play ID, for example, "10". In an embodiment the user can name the clip before is stored in the clip database 128 by the wager sharing server 124. The clip may also include an overlay of GPS information of where the video was taken, the device, a time stamp (e.g., date and time), etc.

Figure 10:
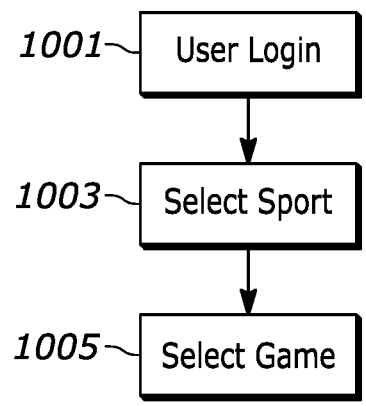
FIG. 10 illustrates an example of a wagering entry.

FIG. 10 illustrates an example of a wagering entry. At step 1001, the user may login. The user may login utilizing biometric data, an email address, user name, password, etc. At step 1003, the user may select a sport of choice. As mentioned, while a sport like golf or basketball may be selected, other types of games may be utilized. Such games may include board games or any other type of game, such as flip cup. At step 1005, the user may select a game to enter. The games may be limited to a country club, city, county, state, or country. In one example, the game may be the first person at a country club to make a hole in one. It may be limited to members of the only club, as the system may utilize the userID to identify the country club membership.

Figure 11:
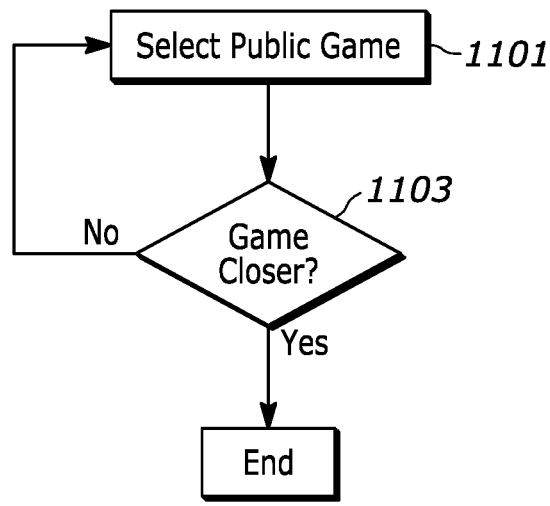
FIG. 11 illustrates an example of a flow chart associated with entering a public game associated with the application.

FIG. 11 illustrates an example of a flow chart associated with entering a public game associated with the application. A public game may allow any participant to enter the game without any restrictions. The public game may be initiated by the host server that is running the application or any member or sponsor. Thus, when the public game is activates any member may join the game. In some embodiments, there may be limited restrictions of a public game based on location, age, etc. Location data may be provided by a GPS unit. Age and user information may be associated with a user profile. At step 1101, the user may elect to participate in a public game. The public game may not have restrictions to enter a game, such as those discussed below with respect to the private game. As discussed above with respect to FIG. 5, the system may evaluate whether a winner has been deemed for the game. If the game is declared a winner, the payout may be determined as already explained. However, otherwise the system may continue to operate the game as needed and repeats the steps. If no winner is deemed, the system may continue to grow the jackpot or prizes as the time increases and/or wagers increase with added users.

At decision 1103, the system may determine whether the public game is officially closed. The public game may be closed based on a participant number, jackpot, time duration, etc. The system may then determine if the game is open, and if the game is open it may allow for more participants to join. If the game is considered closed, it will close off any participants from joining the game. Once the game is closed, the system may keep the game open for another time period or an indefinite period until a winner is determined. The time period may be any type of time (e.g., a day, month, week, etc.) If the time period is indefinite, it may keep the game open until a winner is determined (e.g., a hole-in-one).

Figure 12:
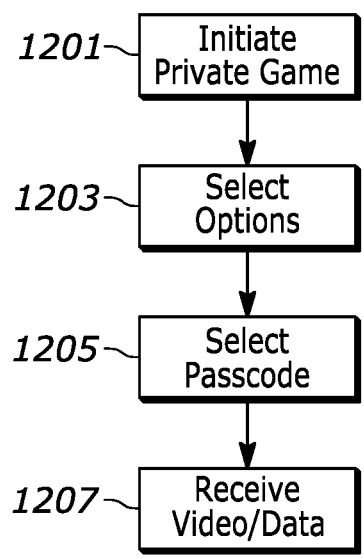
FIG. 12 illustrates an example of a flow chart associated with entering a private game associated with the application.

FIG. 12 illustrates an example of a flow chart associated with entering a private game associated with the application. The user may initiate a private game at step 1201 if they are the commissioner or originator of the game. The initiation of the private game may occur on the application. A decision may be made whether or not the private game may be initiated by the user based on their sport, organization, location etc. For example, based on information associated with the userID, location data, membership information, age information, or other data may be utilized to identify a specific type of user. At step 1203, the user may elect various settings and options of the game. The options may include type of game to be played, as well as various restrictions associated with it. For example, the game may be limited to friends of the commissioner, location-based data, membership association (e.g., country club). At step 1205, the user may elect a passcode associated with entry of the private game. The user may then share the passcode associated with the private game to invite certain users. The system may receive relevant video or data from users at 1207. This may include any necessary information to determine the appropriate user is being utilized (e.g., location data, userID, other authentication, etc.). Furthermore, the system may receive information associated with the video feed. As discussed above with respect to FIG. 5, the system may evaluate whether a winner has been deemed for the game. If the game is declared a winner, the payout may be determined as already explained. However, otherwise the system may continue to operate the game as needed and repeats the steps.

The invention claimed is:

1. A method of recording a video event, comprising:
activating an application on one or more devices to record one or more video images associated with the video event, wherein the application is configured to be secured and create the one or more video images as uneditable;
obtaining one or more video images that include at least a time stamp;
sending the one or more video images to a remote server upon completing of the video images;
identifying, utilizing video recognition at the remote server, whether the one or more videos includes an action associated with a goal of a sporting event tied, wherein the sporting event is tied to a fund that includes wagers from one or more participants of the sporting event;
determining if the one or more video images has been modified by evaluating at least the time stamp and the one or more videos accomplished the goal tied to the sporting event;

outputting, in response to determining the video images has been modified, a cancelation notification indicating cancellation of participation in the sporting event; and outputting, in response to the evaluation, a notification indicating a winning entry associated with the video, wherein the winning entry is associated to a reward associated with the funds.

2. The method of claim 1, wherein the video images includes one or more key codes, wherein the one or more key codes are store at the remote server.

3. The method of claim 1, wherein the output indicates a notification that the one or more video images has been tampered with in response to the determination step.

4. The method of claim 1, wherein the one or more video images are encrypted prior to sending the server.

5. The method of claim 1, wherein the determining if the one or more video images has been modified includes evaluating irregular actions of the participant of the video.

6. The method of claim 1, where determining if the one or more video images has been modified includes at least comparing the one or more video images to a separate video from a separate sensor, wherein the separate video includes a recording of the video event.

7. The method of claim 1, wherein the sporting event is either a public game or a private game, wherein the private game requires login credentials at the application to enter the private game.

8. The method of claim 1, wherein the one or more video images includes a GPS location, wherein the determining if the one or more video images has been modified further evaluates the GPS location.

9. The method of claim 1, wherein a decryption key is located at the server and an encryption key is located at the application.

10. A system, comprising:
a processor programmed to:
activate an application to record one or more video images associated with the video event, wherein the application is configured to be secured to mitigate modification of the one or more video images;
obtain one or more video images that include at least a time stamp;
send the one or more video images to a remote server upon completing of the video images;
identify, utilizing video recognition at the remote server, whether the one or more videos includes an action associated with a goal of a sporting event, wherein the sporting event is tied to a fund that includes wagers from one or more participants of the sporting event;
determine if the one or more video images has been modified by evaluating at least the time stamp;
evaluating the action of the one or more videos of accomplishing the goal tied to the sporting event; and
output, in response to the evaluation, a notification indicating a winning entry associated with the one or more video images, wherein the winning entry is associated to a reward associated with the fund.

11. The system of claim 10, wherein the one or more video images includes a GPS location, wherein the determining if the one or more video images has been modified further evaluates the GPS location.

12. The system of claim 10, wherein a decryption key is located at the server and an encryption key is located at the application.

13. The system of claim 10, wherein the goal includes a hole-in-one and the action includes one or more participants achieving the hole-in-one.

14. The system of claim 10, wherein the processor is further programmed to output, in response to determining the video images has been modified, a cancelation notification indicating cancellation of participation in the sporting event.

15. The system of claim 10, wherein the application is further configured to accept one or more wagers associated with the sporting event.

16. The system of claim 10, wherein the one or more video images are encrypted prior to sending the remote server.

17. The system of claim 10, wherein the one or more video images are encrypted at the remote server.

18. The system of claim 10, wherein the one or more video images is unmodifiable.

19. The system of claim 10, wherein the one or more video images further includes both a GPS location and are encrypted.

20. A method of recording a video event of a participant in a contest, comprising:
activating an application on one or more devices to record one or more video images associated with the video event, wherein the application is configured to be secured and create the one or more video images as uneditable;
obtaining one or more video images that include at least a time stamp;
sending the one or more video images to a remote server upon completing of the video images;
identifying, utilizing video recognition at the remote server, whether the one or more videos includes an action associated with a goal of a sporting event tied, wherein the sporting event is tied to a fund that includes wagers from one or more participants of the sporting event;
determining if the one or more video images has been modified by evaluating at least the time stamp and the one or more videos accomplished the goal tied to the sporting event; and
output, in response to the evaluation, a notification indicating a winning entry associated with the video, wherein the winning entry is associated to a reward associated with the funds.

* * * * *